United States Patent Office 3,068,273
Patented Dec. 11, 1962

3,068,273
1,1'-DITHIOBIS(1-IMINO-2-CYANO-3-HYDROXY-2-ALKENES)
Marvin A. McCall, Kingsport, Tenn., assignor to Eastman Kodak Company, Rochester, N.Y., a corporation of New Jersey
No Drawing. Filed Aug. 18, 1960, Ser. No. 50,306
8 Claims. (Cl. 260—465.5)

This invention relates to 1,1'-dithiobis(1-imino-2-cyano-3-hydroxy-2-alkenes) having the following general structure:

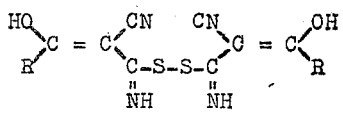

wherein each R represents an alkyl group containing from 1–5 carbon atoms, e.g. methyl, ethyl, propyl, isopropyl, butyl, sec. butyl, amyl, etc. groups.

The above defined new class of compounds of the invention are powerful rodent repellents useful for treating fiber cartons, and the like, thereby rendering them distasteful to rats and other chewing rodents. They are also useful as fungistatic agents. Various fungicidal compositions containing nitrogen and sulfur have been proposed heretofore, for instance the xanthates and carbamates. A difficulty with the xanthates is that they have shown serious phytotoxic effects thus limiting their use to just certain types of plants, for example, sodium isopropylxanthate is marketed as a weed killer. The carbamates are, in practice, used as their metal salts which limits their usefulness because of deleterious effect of certain metals on various plants. Since the compounds of the invention are nonmetallic and have shown a high level of activity without phytotoxicity, they are eminently suitable for treating all kinds of crops including those that are especially sensitive to metals.

It is, accordingly, an object of the invention to provide a new class of active compounds as above defined. Another object is to provide compositions that are especially useful as rodent repellants and fungicides of broad practical applications. Another object is to provide a method for preparing the new compounds. Other objects will become apparent hereinafter.

In accordance with the invention, I prepare my new compounds by mild oxidation of a [2-cyano-3-alkoxy (or hydroxy) thio-2-alkenamide] with an oxidizing agent such as iodine, cupric salts, hydrogen peroxide, etc. and may be illustrated by the following reaction equation:

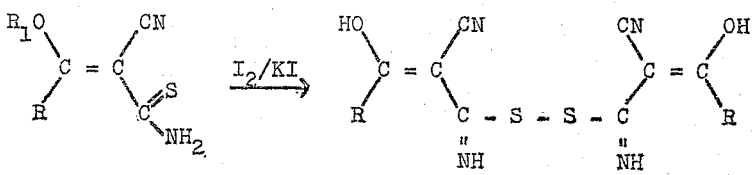

wherein each R is as previously defined and $R_1$ represents a hydrogen atom or an alkyl group containing from 1–5 carbon atoms, e.g. methyl, ethyl, propyl, butyl, sec. butyl, etc. groups. A mixture of two or more different [2-cyano-3-alkoxy (or hydroxy) thio-2-alkenamides] may be used. The reaction temperature can be varied widely, for example, from about 0°–100° C., but preferably the reaction is carried out within the 0° to 20° C. range. While atmospheric pressures are preferred, the reaction can also be conducted at pressures below or above atmospheric pressure. In general, about stoichiometric amounts of the intermediate starting alkenamide is reacted with the oxidizing agent, e.g. 2 moles of the alkenamide to 1 mole of $I_2$ in an aqueous potassium iodide solution; however, a slight excess of iodine is advantageous. The intermediate alkenamides used in the above reaction can be prepared as described in copending application of Marvin A. McCall and Newton H. Shearer, Jr., Serial No. 50,307, filed of even date herewith, by reacting a hydroxyalkylidene malononitrile (F. Bergel, U.S. Patent No. 2,375,185, issued May 8, 1945) or an alkoxyalkylidene malononitrile [Diels et al., Ber., 55, p. 3441; Jones, J. Amer. Chem. Soc., 74, p. 4889 (1952)] with hydrogen sulfide.

The following examples will serve further to illustrate the new class of compounds of the invention and the manner of preparing the same.

*Example 1.*—*1,1'-Dithiobis(1-Imino-2-Cyano-3-Hydroxy-2-Butene)*

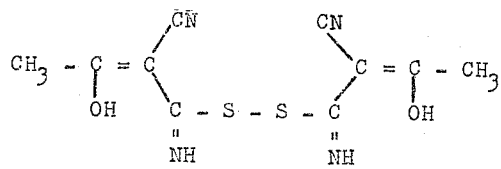

7.1 g. (0.05 mole) of (2-cyano-3-hydroxy)thiocrotonamide was dissolved in 250 cc. of ethyl alcohol. To this solution was slowly added 270 cc. of iodine solution (0.1847 normal I in KI; calcd. that 6.35 g. $I_2$ or 0.025 moles of $I_2$ or 0.05 atoms of I is needed for this reaction). A small amount of crushed ice was added to the alcohol solution and the reaction vessel was cooled externally by crushed ice. As soon as the theoretical quantity of iodine had been added the mixture was stirred for an additional 5 minutes and a few milliliters of excess iodine solution added, then filtered, washed with cold water, then with alcohol and dried. The yield was approximately 7.0 g. M.P. 158–160° C. Analysis.—Calcd. for $C_{10}H_{10}N_4O_2S_2$: C, 42.5; H, 3.57; N, 19.7; S, 22.7. Found: C, 42.42; H, 3.30; N, 19.68; S, 22.63.

*Example 2*

The same products was obtained as in the preceding example by substituting an equivalent amount of (2-cyano-3-ethoxy)thiocrotonamide as the starting material 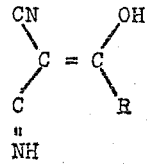 in the process of Example 1.

*Example 3.*—*1,1'-Dithiobis(1-Imino-2-Cyano-3-Hydroxy-2-Pentene)*

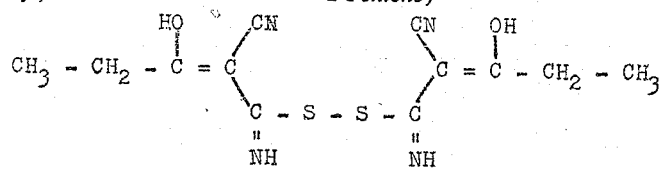

was prepared by substituting an equivalent amount of (2-cyano-3-hydroxy)thio-2-pentenamide as the starting material in the process of Example 1.

*Example 4.—1,1'-Dithiobis(1-Imino-2-Cyano-3-Hydroxy-2-Heptene)*

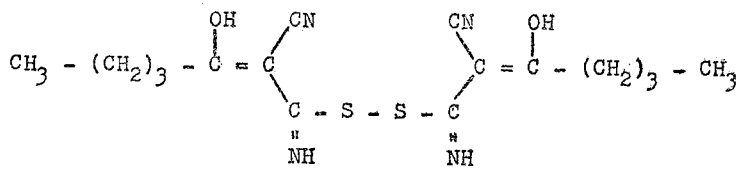

was prepared by substituting an equivalent amount of (2-cyano-3-methoxy)thio-2-heptenamide or (2-cyano-3-hydroxy)thio-2-heptenamide as the starting materials in the process of Example 1.

*Example 5.—Rodent Repellent Action*

The above materials were tested as rodent repellents according to a food acceptance technique which is described in the following publication: Rodent Repellent Studies, I. Development of an Index Number for Expressing Degrees of Repellent Activity, by E. Bellach, J. B. DeWitt, J. Am. Pharm. Soc. (Sci. ed.), 38(2), 109–112 (1949). An index number greater than 85 is indicative of rodent repellent action and 100 is the highest possible index on the scale used. The index numbers reported here are based on tests where the food contained a 2% concentration of the test material unless otherwise indicated. It should be pointed out that the repellents do not have to be mixed with the food in practical applications. It may be incorporated into or onto the packaging material such as burlap bags, cardboard or even plastic bags. A further practical use is in coating seeds in large scale seeding operations to prevent the seeds from being eaten by rodents before they have time to germinate and grow.

| Compound | Repellent Index |
| --- | --- |
| 1. 1,1'-Dithiobis(1-imino-2-cyano-3-hydroxy-2-butene) (from Examples 1 and 2) | 95 |
| 2. 1,1'-Dithiobis(1-imino-2-cyano-3-hydroxy-2-pentene) (from Example 3) | 89 |
| 3. 1,1'-Dithiobis(1-imino-2-cyano-3-hydroxy-2-heptene) (from Example 4) | 88 |

*Example 6.—Fungicidal Activity*

The fungicidal activity of the compounds of this invention was determined by a modification of the sterile filter paper disk technique described by A. M. Kligman and Wm. Rosensweig, J. Invest. Dermatol, 10, 51–8 (1948). In the modified test, sterile filter paper disks 13 mm. in diameter are dipped into a solution or suspension of the compound being tested, excess liquid is drained away, and the disk dropped onto the surface of the agar culture of the fungus in a Petri dish. Three disks are added to each dish; the dishes are kept at a constant temperature, and the zones of inhibition are read after 5–7 days.

The compounds of this invention were tested at a practical level of concentration (2,000 p.p.m.) with the following six fungi species: *monilina, glomerella, pestalozzia, verticillium, helmenthosporium,* and *sclerotinia trifoliorum*. All the compounds of this invention were found to be highly active in that they completely inhibited the growth of all six fungi species.

The above described compounds of the invention are unique in being stable, whereas in general diothio compounds of related structure are known to be unstable and can be isolated only in the form of their salts. For example, E. A Werner, J. Chem. Soc., 101, p. 2168 (1912) discusses a generally similar type disulfide obtained from thiourea, namely, formamidine disulfide:

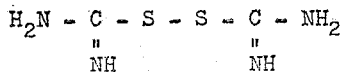

This publication discloses further that this compound is a very weak base and was not obtained in the free state; addition of alkali or even sodium acetate to its salts produced immediate precipitation of sulfur. Formamidine disulfide is itself very prone to further oxidation and hence suffers decomposition during the interaction in proportion to the reactivity of the oxidizing agent used. Another example is thioacetamide, $CH_3C(S)NH_2$, which is known to react with oxidizing agents [Beilstein Org. Chem., 4th ed., 2, I, p. 101 (1929)]; however, the reaction does not give a stable disulfide. Instead the reaction goes on to produce $NH_4I$, HI, $C_2H_5I$ and sulfur. In contrast, the compounds of the invention are stable and they are not salts as no halogen has been detected in their analyses. Actually, it is not known why my new compounds are stable in view of the prior art disclosures. It may possibly be due to the presence of the highly electronegative —CN group or to the conjugated hydroxyl group or to a combination of the electronic effects of these two groups that aid the stability of our new disulfide structures. The presence of these functional groups also makes the compounds of the invention valuable intermediates in chemical syntheses.

The invention has been described in detail with particular reference to preferred embodiments thereof, but it will be understood that variations and modifications can be effected within the spirit and scope of the invention as described hereinabove and as defined in the appended claims.

What I claim is:

1. A compound represented by the following general formula:

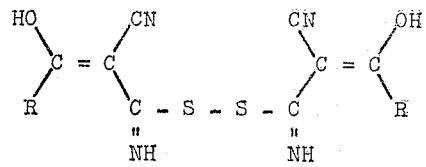

wherein each R represents an alike alkyl group containing from 1–5 carbon atoms.

2. 1,1'-dithiobis(1-imino-2-cyano-3-hydroxy-2-butene).

3. 1,1' - dithiobis(1 - imino-2-cyano-3-hydroxy-2-pentene).

4. 1,1' - dithiobis(1 - imino - 2 - cyano-3-hydroxy-2-heptene).

5. A process for preparing a compound represented by the following general formula:

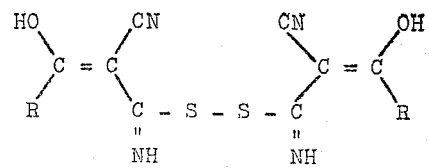

wherein each R represents an alike alkyl group containing from 1–5 carbon atoms, which comprises reacting a thioalkenamide of the general formula:

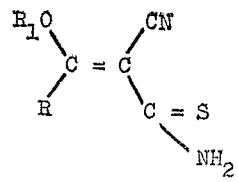

wherein R is as above defined and $R_1$ represents a member selected from the group consisting of hydrogen and an alkyl group containing from 1–5 carbon atoms with an iodine oxidizing agent in aqueous solution, at from 0°–100° C., in about stoichiometric proportions.

6. A process for preparing 1,1'-dithiobis(1-imino-2-cyano-3-hydroxy-2-butene) which comprises reacting (2-cyano-3-hydroxy) thiocrotonamide with iodine in aqueous solution, at from 0°–20° C., in the proportions of about 2 moles of the said thiocrotonamide to at least 1 mole of the said iodine.

7. A process for preparing 1,1'-dithiobis(1-imino-2-cyano-3-hydroxy-2-pentene) which comprises reacting (2-cyano-3-hydroxy)thio-2-pentenamide with iodine in aqueous solution, at from 0°–20° C., in the proportions of about 2 moles of the said pentenamide to at least 1 mole of the said iodine.

8. A process for preparing 1,1'-dithiobis(1-imino-2-cyano-3-hydroxy-2-heptene) which comprises reacting (2-cyano-3-methoxy)thio-2-heptenamide with iodine in aqueous solution, at from 0°–20° C., in the proportions of about 2 moles of the said heptenamide to at least 1 mole of the said iodine.

No references cited.